Dec. 18, 1956     E. KEONJAN ET AL     2,774,875

WAVE GENERATING NETWORK

Filed July 27, 1954

INVENTORS:
EDWARD KEONJAN,
JEROME J. SURAN,

BY *George V Eltgroth*

THEIR ATTORNEY.

United States Patent Office 2,774,875
Patented Dec. 18, 1956

2,774,875
WAVE GENERATING NETWORK

Edward Keonjian and Jerome J. Suran, Syracuse, N. Y., assignors to General Electric Company, a corporation of New York Application July 27, 1954, Serial No. 446,138

11 Claims. (Cl. 250—36)

This invention relates to electric wave generating apparatus utilizing the special properties of transistors.

An extensive literature on wave generators has built up since the early work of DeForest and Armstrong and a very considerable variety of structures for such generators has evolved with the passage of time. The course of the evolution has produced wave generators suitable for use over a tremendous span of the frequency spectrum, ranging from cycles per minute to billions of cycles per second. The techniques which have been utilized are as widely dispersed as the extreme ranges of the frequency spectrum embraced, and include such techniques as thermistors at the low-frequency end of the scale, through a wide range of electron tube networks utilizing both electron density and electron velocity modulation, to and including the magnetron. The structure and characteristics of such wave generators have reflected the varying application demands, but almost invariably a given network is characterized by a capacity for delivering a single type of wave form, or a pre-selected one of a very limited number of wave form types. A review of the art further indicates that it is the orthodox practice to utilize a plurality of reactive elements in the re-entrant networks of wave generators which utilize amplifiers in configurations providing for the transfer of energy between a point of elevated power level and a region of lesser power level.

Accordingly, it is a primary object of the invention to provide a new and novel wave generating network which may be conveniently adjusted to produce a wide variety of wave forms over a broad range of the frequency spectrum.

It is a further object of the invention to provide a new and novel wave generating network beneficially utilizing certain intrinsic properties of transistors.

It is another object of the invention to provide a new and novel wave generating network employing a single, lumped reactive element.

Still another object of the invention is to provide a network selectively rendered phase reversing or non-phase reversing.

Figure 1:
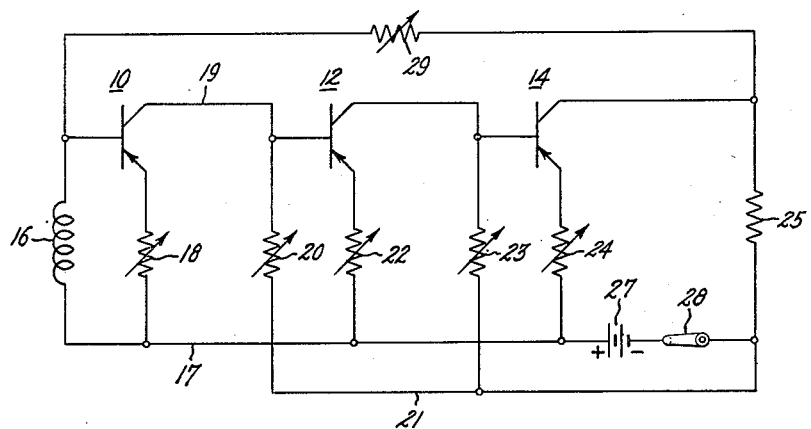

The principles of the invention are clearly developed in the analysis of the embodiment described below. Other objects and advantages of the invention will in part be expressly set forth and in part be made obvious when the following description is read in conjunction with the drawings in which:

Figure 1 is a schematic illustration of a network constructed in accordance with the principles of the invention, and Figures 2, 3, 4, 5, and 6 illustrate the variety of wave forms which may be derived from the network of Figure 1 as the parameters thereof are varied.

Referring now to Figure 1, there is illustrated a re-entrant network comprising cascade-connected transistors 10, 12, and 14. The transistors used for purposes of illustration are of the triode type and the network will operate in a satisfactory manner with either the N–P–N or P–N–P type of transistor. P–N–P transistors have been utilized for illustrative purposes. In addition, any transistor device providing adequate power gain is satisfactory in this network, whether triode, tetrode, or having additional elements, subject only to limitations which may be imposed by later-developed considerations.

The base electrode of the transistor 10 is connected to an inductance 16 whose other terminal is linked to the emitter supply line 17. The emitter of the transistor 10 is connected through a variable resistance 18 with the emitter supply line 17. The collector of the transistor 10 is connected over the line 19 with the base electrode of transistor 12, which is also connected through a variable resistance 20 with the collector supply line 21.

The emitter of transistor 12 is connected with the emitter supply line 17 via variable resistor 22 and the collector of transistor 12 is excited from the collector supply line 21 through a variable resistor 23. The collector end of the resistor 23 may be connected directly with the base electrode of transistor 14.

A variable resistance 24 is connected between the emitter supply line 17 and the emitter of transistor 14, while a load resistance 25 links the collector of transistor 14 with the collector supply line 21. Although shown as a fixed element, the load resistance 25 may also be variable. A source of electric potential indicated at 27, which may have a potential of about 10 volts, has its negative electrode connected with the collector supply line 21 through switch 28, and its positive electrode linked to the emitter supply line 17. A variable feedback resistance 29 connects the collector of transistor 14 with the base of transistor 10.

By adjustment of the values of resistors 18, 20, 22, 23, 24 and 29 the gain around the re-entrant loop may be controlled at will, the operating points of the individual transistors may be determined, the relative voltage levels existing at various points in the re-entrant loop may be fixed, and the operating points of the transistors may be shifted. In accordance with the usual practice, the gain around the re-entrant loop may be expressed as $\alpha + j\beta$.

The network is in an oscillatory condition when a $\rho\theta$ plot of the gain characteristic or the frequency range zero to infinity encloses one or more points satisfying the condition $\alpha > 1$, $\beta$ equals zero, $2\pi \ldots n\pi$ where $n$ is any even integer. The network oscillates when the adjustment of the variable parameters is such that the foregoing condition is satisfied. However, while it is possible through this relationship to express the existence or absence of oscillations in the network, it does not predict wave form and amplitude of oscillation which will be observed. It is possible, however, to predict the simultaneous existence of multiple oscillatory modes if the necessary and sufficient condition exists for more than one frequency.

Figure 2:
Figure 3:
Figure 4:

The range of wave forms which may be exhibited by potentials appearing across the resistor 25 is apparent from an inspection of Figures 2 through 6. As an example, Figure 4 illustrates the wave form which may be observed when $\alpha$ does not greatly exceed unity and the voltage levels appearing at transistors 10 and 12 are not significantly greater than those appearing at transistor 14.

Figure 5:
Figure 6:

A somewhat larger value of $\alpha$ gives rise to a wave form such as shown in Figure 2. The flattening at the top and bottom of the wave forms may result either from essentially symmetrical limiting in a single transistor stage or by sequential limiting of the voltage peaks in successive stages of the loop. For example, the use of relatively high collector resistances in two cascaded stages produces a wave form such as shown in Figure 2. As the real portion of the loop gain is further increased, a wave form such as is shown in Figure 5 is observed, and still further increase in the real component of the loop gain gives rise to wave forms such as shown in Figures 3 and 6, which correspond to conditions where the radius vector has been so extended as to include more than one point satisfying the condition β equals zero, 2π . . . nπ.

This network utilizes the existence of a unique property in transistor amplifiers having the signal applied to the base electrode, when driven into non-linear operating regions. In the small signal range, such an amplifier exhibits phase-reversing properties, but when the negative-going signal applied to the base electrode drives the base electrode to a potential more negative than that assumed by the collector, direct, non-phase reversing signal transfer occurs between the base electrode and the collector. Thus, the input-output transfer characteristic of such a network has a negative slope for small signals, corresponding to phase inversion, and a positive slope for large signals, corresponding to transfer without phase inversion. Since the changeover in the slope of the transfer characteristic occurs when the base electrode becomes more negative than the collector electrode, the signal amplitude at which this occurs is given approximately by the relation:

$$V_i = E_{source} - I_c R_c$$

where $V_i$ = Input voltage
$E_{source}$ = Source voltage
$I_c$ = Collector current drawn during transistor operation
$R_c$ = Resistance in collector circuit Accordingly, $R_c$ is chosen to be equal to or greater than $(E_{source} - V_i)/I_c$. Therefore, when any one of the grounded emitter amplifier stages has been driven into this condition, the phase relationships existing around the loop are modified by the addition or subtraction of π, so that the conditions for oscillation are no longer satisfied. This re-entrant oscillatory network of transistors exhibits a reversal phenomenon at the oscillation limits which is in striking contrast to the conditions existing at the limit of excursion in the thermionic tube oscillators which have been described over the years past. No such change in input-output phase relationships is observed in the thermionic tube oscillator, which reverses its direction of excursion over the oscillation characteristic merely by reason of the fact that the input-output characteristic non-linearity diminishes α in the gain equation to less than unity.

Adjustment of the operating point by modification of either the emitter or collector resistance, further varies the collector current and potential, to modify the capacitance exhibited at this junction. This provides a means for influencing the oscillation frequency of the network at the same time that the loop gain and oscillatory excursion limits are under adjustment. It has been found that variations in resistances 18, 25 and 29 most strongly influence the frequency of oscillation because of their greater influence on the imaginary portion of the gain term. Conversely, changes in the values of resistance 22, 23 affect primarily the real portion of the gain term, except as secondary variations in the imaginary portion of the gain term may result from changes in collector capacitance and changes in the load phase angles.

It will be observed that only one base input transistor amplifier need be present in the re-entrant loop to take advantage of the level-controlled phase reversal contributed by this amplifier when driven into a non-linear region. One or more of the balance of the amplifiers in the re-entrant loop may be of any desired other configuration, such as those commonly referred to as grounded base and/or grounded collector.

The foregoing embodiment is intended primarily as illustrative for developing the explanation of the principles of the invention and is not to be construed as a limitation in its specific aspects. It will be obvious to those skilled in the art that there may be many changes in the relative magnitude, nature and disposition of components, or in many aspects of their organization, without departing from the principles of the invention.

What is claimed as new and to be secured by Letters Patent of the United States is:

1. In an active periodic wave generator, a re-entrant network comprising at least two transistor amplifiers connected in cascade, at least one of said amplifiers having the impressed signal applied to the base electrode thereof, an inductance connected between the base electrode of said one of said amplifiers and an emitter supply lead, a variable resistance connected between the emitter of said one of said amplifiers and said emitter supply lead, and means supplying electric energy to the operating electrodes of said transistor amplifiers.

2. In an active periodic wave generator, a reentrant network comprising at least two transistor amplifiers connected in cascade, at least one of said amplifiers having the impressed signal applied to the base electrode thereof, and inductance connected between the base electrode of said one of said amplifiers and an emitter supply lead, a feedback resistance in the re-entrant loop connecting the base end of said inductance with a preceding point in said loop, and means supplying electric energy to the operating electrodes of said transistor amplifiers.

3. In an active periodic wave generator, a reentrant network comprising at least three amplifying devices connected in cascade, at least one of said amplifying devices being of the transistor type and having the impressed signal applied to the base electrode thereof, an inductance connected between the base electrode of said one of said amplifying devices and an emitter supply lead, a feedback impedance in the re-entrant loop connecting the base end of said inductance with a preceding point in said loop, and means supplying electric energy to the operating members of said amplifying devices.

4. In an active periodic wave generator, a re-entrant network comprising at least three amplifying devices connected in cascade, at least one of said amplifying devices being of the transistor type and having the impressed signal applied to the base electrode thereof, an inductance connected between the base electrode of said one of said amplifying devices and an emitter supply lead, a feedback resistance in the re-entrant loop connecting the base end of said inductance with a preceding point in said loop, and means supplying electric energy to the operating members of said amplifying devices.

5. In an active periodic wave generator, a re-entrant network comprising at least three transistor amplifiers connected in cascade, at least two of said amplifiers having the impressed signal applied to the base electrode thereof, an inductance connected between the base electrode of one of said two amplifiers and an emitter supply lead, means supplying electric energy to the operating electrodes of said transistor amplifiers, and a resistance at least equal to the quotient of peak collector current drawn during transistor action divided into the difference between the potential of said supply means and the peak signal applied to the base of one of said base driven transistors connected to the collector in the collector circuit traversed by said collector current of such transistor.

6. In an active periodic wave generator, a re-entrant network comprising at least three transistor amplifiers connected in cascade, at least two of said amplifiers having the impressed signal applied to the base electrode thereof, an inductance connected between the base electrode of one of said two amplifiers and an emitter supply lead, means supplying electric energy to the operating electrodes of said transistor amplifiers, and a plurality of variable impedance devices included in said network for modifying the operating point and gain of at least one of said transistor amplifiers.

7. In an active periodic wave generator, a re-entrant network comprising at least three transistor amplifiers connected in cascade, at least two of said amplifiers having the impressed signal applied to the base electrode thereof, an inductance connected between the base electrode of one of said two amplifiers and an emitter supply lead, a variable resistance connected between the emitter of said one of said amplifiers and said emitter supply lead, means supplying electric energy to the operating electrodes of said transistor amplifiers, and a plurality of variable resistance devices included in said network for modifying the operating point and gain of at least one of said transistor amplifiers.

8. In an active periodic wave generator, a re-entrant network comprising at least three transistor amplifiers connected in cascade, at least two of said amplifiers having the impressed signal applied to the base electrode thereof, means supplying electric energy to the operating electrodes of said amplifiers, variable resistances connected with the emitters of at least two of said amplifiers, and variable resistances connected with the collectors of at least two of said amplifiers.

9. An active signal transfer network having a transfer characteristic with a positive slope sign for input signals in a first range of amplitude and a transfer characteristic with a negative slope sign for input signals in a second range of amplitude comprising; a transistor including emitter, base and collector electrodes, an impedance connected at one end with said collector electrode, a source of electric energy connected between the other end of said impedance and said emitter electrode, and a signal source driving said base electrode over a potential excursion greater than the difference between the potential of said source and the product of peak collector current and said impedance.

10. An active signal transfer network having a transfer characteristic with a positive slope sign for input signals in a first range of amplitude and a transfer characteristic with a negative slope sign for input signals in a second range of amplitude comprising; a transistor having emitter and collector electrodes and a base of p-type semiconductor material, an impedance connected at one end with said collector electrode, a source of electric energy connected between the other end of said impedance and said emitter electrode with a polarity tending to maintain said collector positive with respect to said emitter and a signal source driving said base to a potential more positive than the potential derived by subtracting from the potential of said source the product of peak collector current and said impedance.

11. An active signal transfer network having a transfer characteristic with a positive slope sign for input signals in a first range of amplitude and a transfer characteristic with a negative slope sign for input signals in a second range of amplitude comprising; a transistor having emitter and collector electrodes and a base of n-type semiconductor material, an impedance connected at one end with said collector electrode, a source of electric energy connected between the other end of said impedance and said emitter electrode with a polarity tending to maintain said collector electrode negative with respect to said emitter electrode, and a signal source driving said base to a potential more negative than the potential derived by subtracting from the potential of said source the product of peak collector current and said impedance.

References Cited in the file of this patent

UNITED STATES PATENTS

| | | |
|---|---|---|
| 2,236,690 | Mathes | Apr. 1, 1940 |
| 2,541,322 | Barney | Feb. 13, 1951 |

OTHER REFERENCES

Article: "Duality as a Guide in Transistor Circuit Design," by Wallace et al.; pages 128–151 of The Transistor published 1952 by Bell Laboratories.

Article: "Some Circuit Aspects of the Transistor," by Ryder et al.; from "The Transistor" cited supra.